Patented July 20, 1954

2,684,373

UNITED STATES PATENT OFFICE 2,684,373

CYCLIC ACETAL TELOMERS

Tracy M. Patrick, Jr., Dayton, Ohio, assignor to Monsanto Chemical Company, St. Louis, Mo., a corporation of Delaware No Drawing. Application November 27, 1950, Serial No. 197,830

16 Claims. (Cl. 260—340.7)

This invention relates to novel telomeric compositions obtained by the free-radical-induced interaction of a cyclic acetal with polyesters of 4- to 6-carbon atom mono-ethylenic unsaturated polycarboxylic acids and to the process for their preparation.

More specifically this invention relates to the discovery that cyclic acetals can be reacted with polyesters of 4- to 6-carbon atom mono-ethylenic unsaturated polycarboxylic acids, wherein the ethylenic bond is conjugated with at least one carbonyl group, selected from the group consisting of maleates, fumarates, citraconates, mesaconates, itaconates, aconitates, and glutaconates in the presence of a free-radical-promoting agent to provide telomeric reaction products.

The definitions pertaining to "telomers" and "telomerization" are to be found in U. S. Patent 2,440,800, wherein said terms were defined so as to provide adequate means for distinguishing reactions such as those as herein disclosed from conventional polymerization reactions.

The term "cyclic acetal" as employed herein is the generic expression employed to embrace the condensation products of one mole equivalent of a saturated aldehyde with one mole equivalent of a saturated dihydric alcohol, wherein the hydroxyl groups are on contiguous carbon atoms or on carbon atoms separated by one carbon atom, e. g., ethylene glycol, propylene glycol, and trimethylene glycol, which products are defined by the structural formula

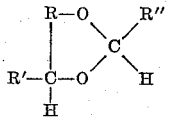

wherein R is a divalent alkylene radical containing from 1 to 2 carbon atoms as a portion of the cyclic ring structure, selected from the group consisting of methylene, ethylene, alkyl-methylene, and alkyl-ethylene radicals; R' and R" are selected from the group consisting of hydrogen and alkyl radicals; and the cyclic acetal ring contains from 5 to 6 members, inclusive. Representative compounds are, for example, 1,3-dioxolane
2-methyl-1,3-dioxolane
2-hexyl-1,3-dioxolane
4-methyl-1,3-dioxolane
4-ethyl-1,3-dioxolane
4-propyl-1,3-dioxolane
4,5-dimethyl-1,3-dioxolane
2-propyl-4-methyl-1,3-dioxolane
1,3-dioxane
2-methyl-1,3-dioxane
2-propyl-1,3-dioxane
2-hexyl-1,3-dioxane
4-ethyl-1,3-dioxane
5-methyl-1,3-dioxane
5,5-dimethyl-1,3-dioxane
2-hexyl-4-ethyl-1,3-dioxane and the like. Preferably no alkyl group should exceed 7 carbon atoms.

The saturated hydrocarbon radicals (R''') of the aforementioned polyesters can be selected from the group consisting of alkyl, aryl, alkaryl, aralkyl and cycloalkyl radicals, as for example, methyl, ethyl, propyl, butyl, hexyl, 2-ethylhexyl, dodecyl, tetradecyl, octadecyl, phenyl, biphenylyl, naphthyl, tolyl, xylyl, mesityl, cumyl, benzyl, phenethyl, cyclopropyl, cyclohexyl, bicyclohexylyl, tetrahydronaphthyl, decahydronaphthyl, tetrahydroabietyl, dehydroabietyl and the like and mixtures thereof.

The term "saturated" as used herein excepts normal benzene ring unsaturation since benzene does not give any reaction with bromine water and practically all of its reactions are those of substitution instead of addition.

In general it is preferable that the ester groups be identical since it is not economical to esterify preferentially the polycarboxylic acid with mixed alcohols to obtain substantially homogeneous products. Illustrative polyesters are, for example, diethyl fumarate, dibutyl itaconate, diethyl itaconate, tributyl aconitate, dimethyl mesaconate, diethyl glutaconate, dibutyl citraconate, diethyl citraconate, dimethyl citraconate, dihexyl maleate, ditetradecyl maleate, dicyclohexyl maleate, dibenzyl maleate, diphenyl maleate, ditolyl maleate and the like. The dimethyl, diethyl, dibutyl, and di(2-ethylhexyl) maleates are currently readily commercially available and are preferred reactants due to their symmetrical structure. Accordingly the said saturated hydrocarbon radical of the ester group preferably contains up to about 20 carbon atoms and more preferably still up to about 8 carbon atoms.

The telomeric compositions of this invention can be diagrammatically represented by the structural formula

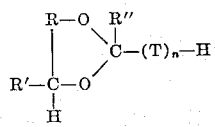

wherein R, R' and R'' are as defined above, $n$ is an integer greater than 1, and T is a taxomon of the aforementioned monoethylenic unsaturated polyesters. In general, $n$ is an integer and can range from about 2 to about 20 and preferably from about 2 to about 5 for an isolated telomer. However, the mixed telomeric compositions are suitable for most purposes without separation into their component parts, thus the average value of $n$ will generally be a mixed number greater than 2. Where Q represents the radical —COOR''' the taxomons can be diagrammatically represented as follows:

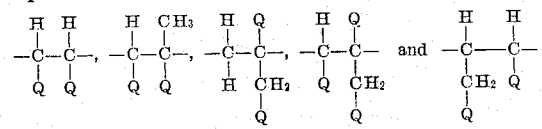

The term "free-radical-promoting agent" as used herein embraces ultraviolet radiation and free-radical-promoting catalysts. The free-radical-promoting catalysts are, for example, acetyl peroxide, t-butyl peroxide, t-butyl hydroperoxide, benzoyl peroxide, lauroyl peroxide, stearoyl peroxide, hydrogen peroxide, peracetic acid, sodium perborate, potassium persulfate and the like, which class of catalysts are generically known as peroxidic catalysts. The free-radical-promoting catalyst is generally employed at from about 0.1 to about 5 mole per cent and preferably from about 0.25 to about 2 mole per cent based on the weight of the total reactants; and the catalyst may be added all at once, in increments or continuously over a period of time.

The temperature at which the reaction is maintained is not critical. The temperature may range from —50° C. to the decomposition point of the reactants but the range of from about 25° C. to about 100° C. is preferred. In general the temperature should be selected such that the free-radical-promoting catalyst is decomposed at a moderate rate during the course of the reaction, for example, if benzoyl peroxide is the free-radical-promoting catalyst a temperature in the range of from about 70° C. to about 90° C. is preferred.

The pressure should preferably be sufficient to maintain the reactants in a liquid state during the reaction, thus relatively volatile reactants should be processed in a pressure vessel. In general, however, a reaction vessel equipped with a reflux condenser is suitable for most reactants.

The mole ratio of the cyclic acetal to the mono-ethylenic polyester can vary over a wide range, the preferred range being from about 4:1 to about 1:4 and more generally an excess of the polyester is preferred although ratios outside these limits are operable.

The reaction can be brought about by the direct mixing of the reactants as shown in the example below or can be brought about in the presence of an inert organic solvent, e. g., benzene, cyclohexane, hexane, and the like, or the cyclic acetal can be added stepwise to the polyester throughout the course of the reaction. Proper agitation, e. g., refluxing, stirring, rocking, passing an inert gas through the system, should be maintained to provide adequate mixing of the reactants.

The following example is illustrative of this invention.

A 64.5-g. sample (0.872 mole) of redistilled 1,3-dioxolane and 50.1 g. (0.291 mole) of redistilled diethyl maleate were mixed together in a reaction vessel fitted with a reflux condenser. The mixture was then brought to reflux (79.2° C.) and 0.5 g. of benzoyl peroxide was added thereto. After 16.5 hours the temperature had risen to 100° C. and heating was discontinued.

The reaction mixture was then distilled through a ten-inch Vigreux fractionating column and the unreacted diethyl maleate and excess 1,3-dioxolane were recovered. An approximately 25% yield of a colorless viscous liquid, which was identified as diethyl 2-(1,3-dioxolanyl)succinate, was obtained. This material had the following physical constants: B. P. 120–125° C./1 mm., $n_D^{25}$ 1.4457, and $$d_{25}^{25}\ 1.1426$$

Calculated for $C_{11}H_{18}O_6$: C, 53.64%; H, 7.37%. Found: C, 53.49%; H, 7.06%.

The molar refraction was observed to be 57.6 and the theoretical value is 57.4.

A residue of 30.1 g. of a yellow viscous liquid telomeric composition was obtained. This material did not distill at a pot temperature of 225° C. and 2 mm. of mercury and had a refractive index of 1.4732 at 25° C.

The novel telomeric compositions of this invention are useful as lubricants, lubricant additives, softeners for synthetic rubber, wax composition additives and anti-foam agents.

This application is a continuation-in-part of my copending application Serial Number 180,079, filed August 17, 1950, now abandoned.

I claim:
1. The telomeric composition

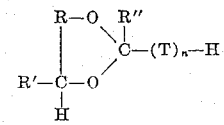

wherein R is a divalent alkylene radical containing from 1 to 2 carbon atoms as a portion of the cyclic ring structure, the cyclic ring containing from 5 to 6 members, inclusive, R' and R'' are selected from the group consisting of hydrogen and alkyl radicals containing up to 7 carbon atoms, T is selected from the group of divalent radicals consisting of

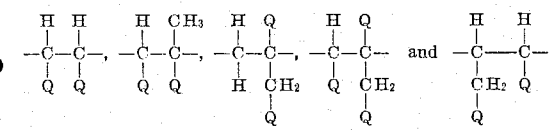

wherein Q represents the radical —COOR''' and —R''' is a saturated hydrocarbon radical containing up to 20 carbon atoms, and $n$ is an integer from 2 to 20.

2. The telomeric composition

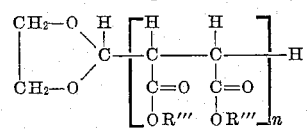

wherein R''' is ethyl and $n$ is an integer from 2 to 5.

3. The telomeric composition

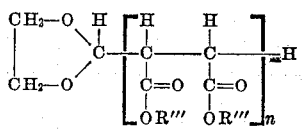

wherein R''' is 2-ethylhexyl and $n$ is an integer from 2 to 5.

4. The telomeric composition

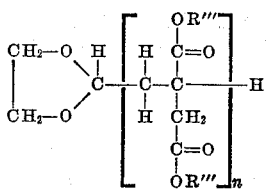

wherein R''' is ethyl and $n$ is an integer from 2 to 5.

5. The telomeric composition

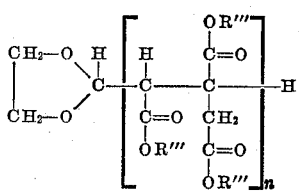

wherein R''' is butyl and $n$ is an integer from 2 to 5.

6. The telomeric composition

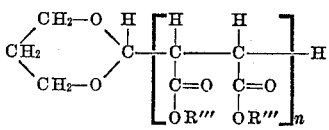

wherein R''' is ethyl and $n$ is an integer from 2 to 5.

7. The telomeric composition

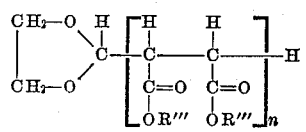

wherein R''' is a saturated hydrocarbon radical containing up to 20 carbon atoms and $n$ is an integer from 2 to 20.

8. The telomeric composition

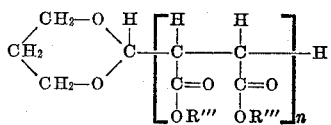

wherein R''' is a saturated hydrocarbon radical containing up to 20 carbon atoms and $n$ is an integer from 2 to 20.

9. The process of preparing chemical compositions comprising the reaction of (A) a cyclic acetal having the formula

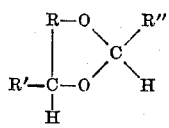

wherein R is a divalent alkylene radical containing from 1 to 2 carbon atoms as a portion of the cyclic ring structure, R' and R'' are selected from the group consisting of hydrogen and alkyl radicals containing up to 7 carbon atoms, and the cyclic acetal ring contains from 5 to 6 members, with (B) the polyester of a 4- to 6-carbon atom mono-ethylenic unsaturated polycarboxylic acid, wherein the ethylenic bond is conjugated with at least one carbonyl group, selected from the group consisting of maleates, fumarates, citraconates, mesaconates, itaconates, aconitates, and glutaconates, and the alcohol moiety of said polyesters is a saturated hydrocarbon radical containing up to 20 carbon atoms, in the presence of (C) a catalytic amount of a free-radical-promoting peroxidic catalyst.

10. The process of preparing a telomeric composition comprising the reaction of (A) one mole equivalent of 1,3-dioxolane with (B) from about one to about four mole equivalents of diethyl maleate in the presence of (C) from about 0.1 to about 5 moles percent, based on the weight of the total reactants, of benzoyl peroxide said reaction being initiated at a temperature of from about 70° C. to about 90° C. and heating is continued for a time sufficient to produce a substantial quantity of the telomeric composition.

11. The process of preparing a telomeric composition comprising the reaction of (A) one mole equivalent of 1,3-dioxolane with (B) from about one to about four mole equivalents of di-(2-ethylhexyl) maleate in the presence of (C) from about 0.1 to about 5 moles percent, based on the weight of the total reactants, of benzoyl peroxide said reaction being initiated at a temperature of from about 70° C. to about 90° C. and heating is continued for a time sufficient to produce a substantial quantity of the telomeric composition.

12. The process of preparing a telomeric composition comprising the reaction of (A) one mole equivalent of 1,3-dioxolane with (B) from about one to about four mole equivalents of diethyl itaconate in the presence of (C) from about 0.1 to about 5 moles percent, based on the weight of the total reactants, of benzoyl peroxide said reaction being initiated at a temperature of from about 70° C. to about 90° C. and heating is continued for a time sufficient to produce a substantial quantity of the telomeric composition.

13. The process of preparing a telomeric composition comprising the reaction of (A) one mole equivalent of 1,3-dioxolane with (B) from about one to about four mole equivalents of tributyl aconitate in the presence of (C) from about 0.1 to about 5 moles percent, based on the weight of the total reactants, of benzoyl peroxide said reaction being initiated at a temperature of from about 70° C. to about 90° C. and heating is continued for a time sufficient to produce a substantial quantity of the telomeric composition.

14. The process of preparing a telomeric composition comprising the reaction of (A) one mole equivalent of 1,3-dioxane with (B) from about one to about four mole equivalents of diethyl fumarate in the presence of (C) from about 0.1 to about 5 moles percent, based on the weight of the total reactants, of benzoyl peroxide said reaction being initiated at a temperature of from about 70° C. to about 90° C. and heating is continued for a time sufficient to produce a substantial quantity of the telomeric composition.

15. The process of preparing telometric compositions comprising the reaction of (A) one mole equivalent of 1,3-dioxolane with (B) from about one to about four mole equivalents of a dialkyl maleate, wherein the alkyl radical contains up to 8 carbon atoms, in the presence of (C) from about 0.1 to about 5 mole percent, based on the weight of the total reactants, of benzoyl peroxide said reaction being initiated at a temperature of from about 70° C. to about 90° C. and heating is continued for a time sufficient to produce a substantial quantity of the telomeric composition.

16. The process of preparing telomeric compositions comprising the reaction of (A) one mole equivalent of 1,3-dioxane with (B) from about one to about four mole equivalents of a dialkyl maleate, wherein the alkyl radical contains up to 8 carbon atoms, in the presence of (C) from about 0.1 to about 5 mole per cent, based on the weight of the total reactants, of benzoyl peroxide said reaction being initiated at a temperature of from about 70° C. to about 90° C. and heating is continued for a time sufficient to produce a substantial quantity of the telomeric composition.

References Cited in the file of this patent

UNITED STATES PATENTS

| Number | Name | Date |
|---|---|---|
| 2,479,146 | Wood | Aug. 16, 1949 |

OTHER REFERENCES

Marvel, J. Am. Chem. Soc. 69, 52–8 (1947).
Kuhn, J. Prakt. Chem. 156, 142, 147, 148 (1940).